United States Patent
Chen et al.

(10) Patent No.: US 8,249,017 B2
(45) Date of Patent: Aug. 21, 2012

(54) CELLULAR COMMUNICATION SYSTEM AND METHOD OF OPERATION THEREFOR

(75) Inventors: Bonnie Chen, Grapevine, TX (US); Paul V. Flynn, Glen Ellyn, IL (US)

(73) Assignee: Motorola Mobility LLC, Libertyville, IL (US)

( * ) Notice: Subject to any disclaimer, the term of this patent is extended or adjusted under 35 U.S.C. 154(b) by 670 days.

(21) Appl. No.: 12/394,081

(22) Filed: Feb. 27, 2009

(65) Prior Publication Data

US 2009/0247165 A1   Oct. 1, 2009

Related U.S. Application Data

(60) Provisional application No. 61/039,315, filed on Mar. 25, 2008.

(51) Int. Cl.
*H04W 4/00* (2009.01)
*H04L 12/28* (2006.01)
*H04L 12/56* (2006.01)

(52) U.S. Cl. ......... 370/331; 370/353; 370/354; 370/401

(58) Field of Classification Search ................... 370/331, 370/352–356, 401
See application file for complete search history.

(56) References Cited

U.S. PATENT DOCUMENTS

| | | | |
|---|---|---|---|
| 6,308,069 B1 * | 10/2001 | Freitag et al. | 455/435.1 |
| 2006/0087991 A1 * | 4/2006 | Christie, IV | 370/310 |
| 2006/0148535 A1 | 7/2006 | Schaefer et al. | |
| 2009/0086674 A1 * | 4/2009 | Ejzak | 370/331 |
| 2011/0177794 A1 * | 7/2011 | Nylander et al. | 455/411 |

OTHER PUBLICATIONS

3GPP TSG SA WG2 Meeting #62, TD S2-080408, Marina Del Rey, California, USA, Jan. 14-18, 2008, "Add CS fallback function (Mobil Originating procedures)", NTT DoCoMo, NEC, pp. 1-8.
3GPP TS 23.402 v8.0.0 (Dec. 2007), "3rd Generation Partnership Project; Technical Specification Group Services and System Aspects; Architecture enhancements for non-3GPP accesses (Release 8)", pp. 1-131.
3GPP TS 23.401 v8.0.0 (Dec. 2007), "3rd Generation Partnership Project; Technical Specification Group Services and System Aspects; General Packet Radio Service (GPRS) enhancements for Evolved Universal Terrestrial Radio Access Network (E-UTRAN) access (Release 8)", pp. 1-167.

* cited by examiner

*Primary Examiner* — Ronald Abelson

(57) ABSTRACT

A cellular communication system comprises a core network, a first access network not supporting circuit switched services and a second access network supporting circuit switched services. A user equipment detects that an application using circuit switched communication is initiated and accordingly initiates a reselection from the first to the second access network. The user equipment transmits a location update message to a circuit switch mobile switching center of the core network which in response notifies a mobility management entity for the first access network that the access network reselection has been initiated. In response to the notification the mobility management entity initiates a change of a routing association from being with the first access network to being with the second access network. The invention may e.g. allow improved circuit switched fallback for a $3^{rd}$ Generation Partnership Project cellular communication system comprising an access network supporting only packet switched services.

20 Claims, 7 Drawing Sheets

CELLULAR COMMUNICATION SYSTEM AND METHOD OF OPERATION THEREFOR

CROSS-REFERENCE(S) TO RELATED APPLICATION(S)

The present application claims priority from provisional application Ser. No. 61/039,315, entitled "CELLULAR COMMUNICATION SYSTEM AND METHOD OF OPERATION THEREFOR," filed Mar. 25, 2008, which is commonly owned and incorporated herein by reference in its entirety.

FIELD OF THE INVENTION

The invention relates to a cellular communication system and a method of operation therefor and in particular, but not exclusively, to a $3^{rd}$ Generation Partnership Project cellular communication system.

BACKGROUND OF THE INVENTION

Cellular communication systems supporting mobile communications have become ubiquitous and in particular second generation cellular communication systems such as the Global System for Mobile Communication and third Generation cellular communication systems such as the Universal Mobile Telecommunication System (UMTS) have become widespread.

In order to provide improved communication services and increased efficiency, cellular communication systems are continuously developed and enhanced. For example, currently, the $3^{rd}$ Generation Partnership Project (3GPP) standards body is in the process of standardising improvements to GSM and UMTS known as Long Term Evolution (LTE)/System Architecture Evolution (SAE).

Furthermore, there is a strong desire for new communication standards and enhancements to be implemented while allowing existing functionality to still be used. Accordingly, 3GPP has standardised a network architecture wherein different radio access networks are coupled to a common core network. For example, a 3GPP communication system may comprise both a UMTS Terrestrial radio access network (UTRAN) and a GSM EDGE (Enhanced Data rates for GSM Evolution) radio access network coupled to a common core network. In addition, 3GPP is standardising LTE/SAE to allow an LTE based radio access network known as Evolved-UTRAN (E-UTRAN) to be coupled to the 3GPP core network.

However, a challenge for such an approach is that of how provide efficient and practical interworking of the different radio access networks in order to allow communication services to be effectively provided to user equipments. Furthermore, this problem is complicated by the communication system needing to support both circuit switched services, such as for conventional (GSM) voice calls, as well as packet switched services, such as e.g. data services for Internet access.

In particular, the core network comprises circuit switched network elements, such as 3GPP Mobile Switching Centres (MSCs), for switching circuit switched services as well as packet switched network elements, such as Serving GPRS Support Nodes (SGSNs), for routing packet switched services. Indeed, most deployed 3GPP core networks comprise the required functionality for supporting both packet and circuit switched services of UTRANs and GERANs. Furthermore, this functionality is also suitable for supporting packet services of E-UTRANs. However, it has been the intention that E-UTRAN circuit switched like services will exclusively be supported by new core network functionality known as the IP Multimedia Subsystem (IMS). IMS is an architectural framework for delivering Internet Protocol (IP) multimedia to mobile users. IMS is being standardized by 3GPP and is part of the vision for evolving cellular networks towards an IP based system.

However, as IMS requires introduction of new functionality with an associated cost impact, there has been a desire to allow circuit switched services to be supported without the requirement of IMS functionality.

Specifically, for a system comprising both an E-UTRAN and a UTRAN and/or GERAN it has accordingly been proposed that a user equipment camped on the E-UTRAN may switch to the UTRAN/GERAN in order to set up a circuit switched call. Specifically, 3GPP has initiated a new work item called Circuit Switch Fallback with the objective of specifying the architecture enhancements and functionality required to enable fallback from E-UTRAN access to UTRAN/GERAN circuit switched domain access. Using this functionality, voice and other circuit switched services are realized by reuse of existing circuit switched infrastructure. The architecture for this feature is being defined in 3GPP technical specification TS 23.272, "Circuit switched Fallback in Evolved Packet System".

A specific problem of this approach is how to ensure a reliable and efficient switching of the destinations for incoming paging and packet session setup requests for the user equipments. Specifically, although a user equipment may be simultaneously registered with an E-UTRAN and a UTRAN/GERAN in the sense that the radio access networks may have information of the user equipment being contactable in the system, it can only be reached through one radio access network at any given time. Thus, whereas the user equipments may be registered with more than one radio access network, a user equipment will typically only be able to camp on one radio access network at a time. In particular, a single radio user equipment in idle mode will only be able to monitor for paging and control messages in a single radio access network and accordingly it is important that the system keeps track of which radio access network the user equipment is currently camped on.

Accordingly, if a user equipment is camped on the E-UTRAN and seeks to initiate a circuit switched call, the circuit switched fallback feature allows this circuit switched call to be set up via the UTRAN/GERAN. However, as the user equipment switches to the UTRAN/GERAN, it is required that the routing/paging information in the system is switched from pointing to the E-UTRAN to pointing to the UTRAN/GERAN.

It has been suggested that this can be achieved by preserving packet switched bearers before setting up any circuit switched domain calls or services. Specifically a standards contribution has proposed an approach for call establishment that requires the user equipment to first establish a packet data session via the E-UTRAN, then handing this packet session over to the packet switched domain of the GERAN/UTRAN before finally setting up a circuit switched call in the UTRAN/GERAN.

However, although this approach may reduce the impact on a legacy MSC it also has a number of disadvantages. For example, it is a relatively complex process requiring additional signalling and operations to be performed by the user equipment. Furthermore, it substantially increases the time it takes to set up a circuit switched call. Indeed, a substantial delay is incurred as a dummy packet session must be established and handed over before the set up of the circuit switched call can be initiated.

Hence, an improved communication system would be advantageous and in particular a system allowing increased flexibility, reduced call setup times, increased backwards compatibility, improved support for circuit switched services, improved support for different radio access networks, facilitated operation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a cellular communication system comprising: a core network, a first radio access network coupled to the core network, the first radio access network being a packet switched network; a second radio access network coupled to the core network, the second radio access network being a packet switched and circuit switched radio access network; a user equipment capable of supporting air interface communications of both the first radio access network and the second radio access network; a mobility management entity for managing user equipment mobility in the first radio access network; and a circuit switch mobile switching centre arranged to support circuit switched communications of the second radio access network; and wherein the user equipment comprises: a detecting unit for detecting an initiation of a circuit switched application supported by a circuit switched communication service, and a reselection unit for initiating an access network reselection process from the first radio access network to the second radio access network in response to the detection, the reselection unit being arranged to transmit a location update message to the circuit switch mobile switching centre; the circuit switch mobile switching centre comprises a notifying unit for notifying the mobility management entity of the initiation of the access network reselection process in response to receiving the location update message; and the mobility management entity comprises a routing change unit for initiating a routing association change for a routing association of the user equipment from being an association with the first radio access network to being an association with the second radio access network in response to the notification.

The invention may allow improved performance and/or operation for a cellular communication system. In particular, the invention may allow improved interworking between different radio access networks. In particular, the invention may allow improved support for circuit switched services and may e.g. allow a user equipment to effectively be supported by a circuit switched service even if camped on a packet switched only network. The invention may allow an improved radio access network reselection from the first radio access network to the second radio access network.

The cellular communication system may specifically be a 3GPP cellular communication system. The first radio access network may specifically be an Evolved-Universal Mobile Terrestrial System (UMTS) Terrestrial Radio Access Network (E-UTRAN). The second radio access network may specifically be at least one of a $3^{rd}$ Generation Partnership Project (3GPP) third generation radio access network and a 3GPP second generation radio access network. For example, the second radio access network may specifically be a UMTS Terrestrial Radio Access Network (UTRAN), a GSM (Global System for Mobile communication) EDGE (Enhanced Data rates for GSM Evolution) Radio Access Network (GERAN) or a combined UTRAN/GERAN.

In such embodiments, the circuit switch mobile switching centre may specifically be a 3GPP Mobile Switching Centre (MSC) and the mobility management entity may be an E-UTRAN Mobility Management Entity (MME). Furthermore, the location update message may be a Location Updating Request message in accordance with 3GPP Technical Specification 24.008 or a Routing Area Update Request message in accordance with 3GPP Technical Specification 24.008.

In such embodiments, the invention may in particular provide improved circuit switched support in a system comprising an E-UTRAN but not the IMS functionality required to support circuit switched services in E-UTRAN. In particular, the invention may allow circuit switched fallback operation with a reduced call setup delay while still allowing efficient adaptation of the network routing information following the radio access network reselection. The required complexity and signalling by the user equipment may be reduced. Furthermore, only minor modifications to legacy equipment may be necessary thereby providing improved backwards compatibility and reduced cost of deployment.

The routing association may specifically be a routing address or path for incoming paging or packet session setup requests.

The user equipment may be operating in idle mode and may specifically be operable to be camped on only one radio access network when in idle mode. The notifying unit may be able to notify the mobility management entity directly or indirectly. For example, the mobile switching centre may, in response to receiving the location update message, be arranged to generate and transmit a message to an intervening network element that will result in the mobility management entity receiving a message indicating that a routing update should be performed by the mobility management entity.

In accordance with some embodiments of the invention, the notifying unit is arranged to transmit a routing area update notification to a packet switched network element of the core network supporting the second radio access network; and the packet switched network element comprises means for transmitting a routing update message to the mobility management entity in response to receiving the routing area update notification.

This may in many embodiments provide facilitated implementation and/or improved performance. In particular, it may in many embodiments reduce the modifications required to introduce the approach to existing systems.

The packet switched network element may specifically be a 3GPP Serving GPRS (General Packet Radio Service) Support Node (SGSN). The feature may specifically allow the SGSN and MME to use existing routing update procedures to achieve the routing update from the E-UTRAN to the UTRAN/GERAN.

For a 3GPP implementation with E-UTRAN and UTRAN/GERAN networks, the approach may allow the call setup time for a circuit switched fallback process to be reduced by the user equipment moving directly from the E-UTRAN to the GERAN/UTRAN and setting up a circuit switched call without requiring any intermediate packet sessions to be set up. The process can specifically include a routing redirection initiated by the MSC indicating to the SGSN that a Routing Area Update has occurred. This then allows the SGSN to complete a Routing Area Update interaction with the MME.

The routing update message may specifically be a context request message such as a Context Request message in accordance with 3GPP Technical Specification 23.401.

In accordance with some embodiments of the invention, the user equipment is arranged to initiate the access network reselection process upon the detection of the initiating of the circuit switched application and prior to the initiation of the circuit switched call setup.

This may allow an improved user experience and may typically reduce the call setup delay. Specifically, the user equipment may detect that an application is started which is typically served by a circuit switched communication service. At the point of detection of the initiation of the application, the user equipment may initiate the reselection from the first to the second radio access network such that the user equipment is camped on the second radio access network rather than on the first radio access network. Thus, the system may be made ready for a circuit switched call setup. However, the actual circuit switched call setup may not be instigated until a later point in time, e.g., when the application specifically requests the circuit switched call functionality. At this time, the call setup is initiated and will be completed with a reduced delay as the radio access network switch has already been performed.

The detection of the initiation of the application may, e.g., be in response to a user action, such as when a user starts dialling a phone number or starts writing a text message.

According to an aspect of the invention there is provided a circuit switch mobile switching centre for a cellular communication system, which cellular communication system includes a core network; a first radio access network coupled to the core network, the first radio access network being a packet switched network; a second radio access network coupled to the core network, the second radio access network being a packet switched and circuit switched radio access network; and a mobility management entity for managing user equipment mobility in the first radio access network; the circuit switch mobile switching centre comprising: a unit for supporting circuit switched communications of the second radio access network; and a notifying unit for notifying the mobility management entity of the initiation of an access network reselection process from the first radio access network to the second radio access network in response to receiving a location update message from the user equipment via the second radio access network.

According to a different aspect of the invention there is provided a method of operation for a cellular communication system which includes a core network; a first radio access network coupled to the core network, the first radio access network being a packet switched network; and a second radio access network coupled to the core network, the second radio access network being a packet switched and circuit switched radio access network; a mobility management entity for managing user equipment mobility in the first radio access network; and a circuit switch mobile switching centre arranged to support circuit switched communications of the second radio access network; and the method comprising: the user equipment performing the steps of: detecting an initiation of a circuit switched application supported by a circuit switched communication service, initiating an access network reselection process from the first radio access network to the second radio access network in response to the detection, and transmitting a location update message to the circuit switch mobile switching centre; the circuit switch mobile switching centre performing the step of notifying the mobility management entity of the initiation of the access network reselection process in response to receiving the location update message; and the mobility management entity performing the step of initiating a routing association change for a routing association of the user equipment from being an association with the first radio access network to being an association with the second radio access network in response to the notification.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a 3GPP cellular communication system comprising both E-UTRAN and UTRAN/GERAN random access networks. However, it will be appreciated that the invention is not limited to this application but may be applied to many other cellular communication systems.

Figure 1:
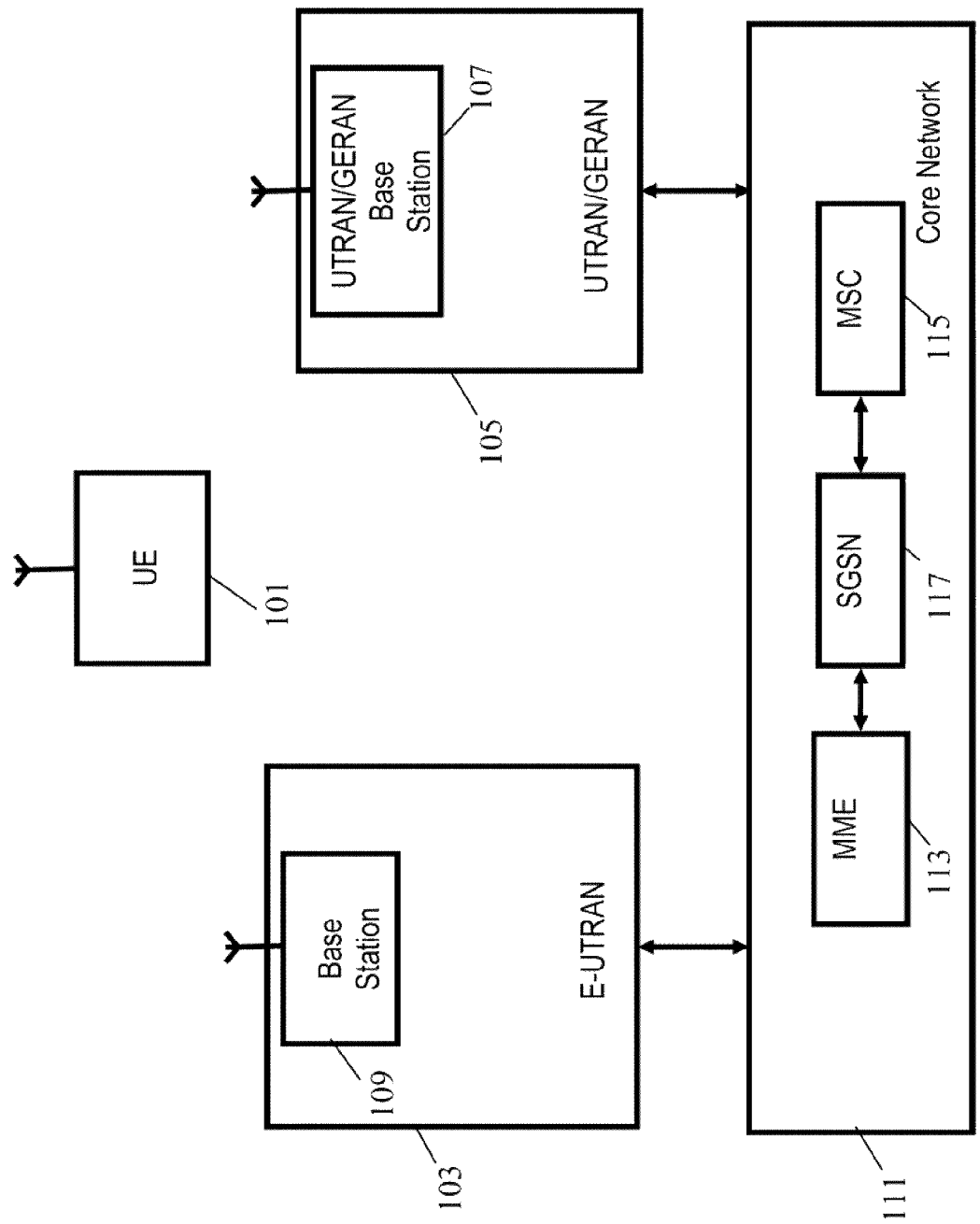
FIG. 1 illustrates an example of elements of a cellular communication system in accordance with some embodiments of the invention.

FIG. 1 illustrates an example of elements of a cellular communication system in accordance with some embodiments of the invention.

FIG. 1 illustrates a user equipment 101 which is a multi-mode user equipment capable of communicating over a radio air interface in accordance with different radio access technologies.

The communication system comprises a first radio access network which specifically is an E-UTRAN radio access network 103 and a second radio access network which specifically is a combined UTRAN/GERAN radio access network 105.

Thus, in the example, all of the radio access networks are 3GPP radio access networks with the UTRAN/GERAN radio access network 105 comprising both $2^{nd}$ generation radio access network functionality as well as $3^{rd}$ generation radio access network functionality. Furthermore, the UTRAN/GERAN radio access network 105 comprises both circuit switched and packet switched functionality and can thus support both packet and circuit switched services. It will be appreciated that in other embodiments, the second radio access network may, e.g., comprise only a UTRAN or a GERAN or may comprise other types of radio access network.

The UTRAN/GERAN radio access network 105 comprises a number of UTRAN/GERAN base stations (of which one base station 107 is shown). Furthermore, the UTRAN/GERAN radio access network 105 will comprise a number of functional elements required or desired for implementing a UTRAN/GERAN radio access network as will be known to the person skilled in the art. For example, the UTRAN/GERAN radio access network 105 can comprise GSM Base Station Controllers (BSCs), Radio Network Controllers (RNCs) etc.

The E-UTRAN radio access network 103 comprises a number of evolved base stations (of which one 109) is shown. The evolved base stations 109 are capable of supporting air interface communications in accordance with the Long Term Evolution (LTE) standards and principles. As such, the E-UTRAN can efficiently support packet switched communication services.

It will be appreciated that the E-UTRAN 103 furthermore comprises a number of further functional elements required or desired for implementing the E-UTRAN functionality as will be known to the person skilled in the art.

The E-UTRAN 103 and the UTRAN/GERAN 105 are both coupled to a core network 111 which is arranged to interface and route data between the radio access networks as well as to provide interworking with other networks and communication systems. In addition, the core network provides operations and management functions including billing functions etc.

In the example, the core network is based on the 3GPP standards for $2^{nd}$ and $3^{rd}$ generation cellular communication systems. Thus, the core network comprises a number of network elements supporting the radio access networks 103, 105 including MSCs (Master Switch Centres), SGSNs (Serving GPRS Support Nodes), GGSNs (Gateway GPRS Support Nodes), HLRs (Home Location Registers), VLRs (Visitor Location Registers), MGWs (Media GateWays) etc.

In the system, the core network 111 comprises an E-UTRAN Mobility Management Entity (MME) 113 which supports mobility for user equipments within the E-UTRAN. In particular, for user equipments registered with the E-UTRAN 103 and currently active or camped on the E-UTRAN 103, the MME 113 stores appropriate routing information that allows incoming data to be routed to the appropriate evolved base station 109. In particular, for idle mode user equipments camped on the E-UTRAN 103, the MME 113 contains routing data allowing incoming paging data/packet session setup requests to be routed correctly to the user equipments.

However, in the example, the core network 111 does not comprise any IMS (IP Multimedia Subsystem) functionality and accordingly it cannot support circuit switched services from the E-UTRAN. Thus, whereas the combination of the UTRAN/GERAN 105 and the core network 111 can operate in both the packet switched domain and in the circuit switched domain, the combination of the E-UTRAN 103 and the core network 111 can only operate in the packet switched domain.

FIG. 1 furthermore illustrates an MSC 115 and an SGSN 117 which are part of the core network 111. The MSC 115 belongs to the circuit switched domain and is operable to support circuit switched services of the UTRAN/GERAN 105 whereas the SGSN 117 is operable to support packet switched services of the UTRAN/GERAN 105. In particular, in the example, the MSC 115 is the serving MSC for the UTRAN/GERAN base station 107 and the SGSN 117 is a serving SGSN for the UTRAN/GERAN base station 107.

In the example, the user equipment 101 is within the coverage area of both the UTRAN/GERAN 105 and the E-UTRAN 103. Furthermore, the user equipment 101 comprises functionality for communication in accordance with the air interface specifications for the E-UTRAN 103 and for the UTRAN/GERAN 105. However, the user equipment 101 comprises only a single transceiver and is only capable of receiving one radio signal at a time. Accordingly, the user equipment 101 cannot simultaneously monitor control and paging transmission from both the E-UTRAN 103 and the UTRAN/GERAN 105. Accordingly, in idle mode, the user equipment 101 selects one of the radio access networks 103, 105 and camps on this network.

In the example, the user equipment 101 may be simultaneously registered with both the E-UTRAN 103 and the UTRAN/GERAN 105 in the sense that both the E-UTRAN 103 and the UTRAN/GERAN 105 (or the network elements of the core network 111 supporting these) may have knowledge of the user equipment 101 being available for incoming communications. In particular, a VLR and/or HLR of the core network 111 may comprise information of a current network location of the user equipment 101 and this information may be accessible by both network elements of or supporting the E-UTRAN 103 and network elements of or supporting the UTRAN/GERAN 105.

However, in the example, the user equipment 101 can only monitor one of the radio access networks 103, 105 and accordingly can in idle mode only be camped on one of the radio access networks 103, 105. Accordingly, an idle mode user equipment 101 registered with both the E-UTRAN 103 and the UTRAN/GERAN 105 can only be reached through one of the radio access networks 103, 105. In particular, the user equipment 101 can only be reached via either the E-UTRAN 103 or the UTRAN/GERAN 105, and accordingly an incoming packet session setup request or paging message must be routed to the appropriate radio access network 103, 105.

In the situation where the user equipment 101 is in idle mode and camped on the E-UTRAN 103, the MME 113 comprises the mobility information identifying the required routing to reach the user equipment 101. Furthermore, incoming packet session requests are routed to the MME 113, e.g., from a suitable MGW of the core network 111.

In such a scenario, the user equipment 101 can also setup packet sessions by accessing the E-UTRAN 103. However, an efficient circuit switched service cannot be supported as the core network 111 does not comprise the IMS functionality required to support LTE circuit switched services. Accordingly, the user equipment 101 may use a circuit switched fallback technique wherein the user equipment 101 initiates a circuit switched call setup directly with the UTRAN/GERAN 105.

Thus, rather than initially setting up a packet session with the E-UTRAN 103, then handing this over to the UTRAN/GERAN 105, and then setting up the circuit switched service in the UTRAN/GERAN 105, the user equipment 101 of the system of FIG. 1 directly initiates the circuit switched call setup with the UTRAN/GERAN 105 without any prior packet sessions being set up with either the UTRAN/GERAN 105 or the E-UTRAN 103. Indeed, the UTRAN/GERAN circuit switched call setup is performed without the user equipment 101 communicating with the E-UTRAN 103.

In the system, the routing update required in order to change the routing for any incoming packet session requests/paging messages is not directly initiated by the user equipment 101 (and in particular not by the user equipment 101 communicating with the E-UTRAN 103) but is instead initiated by the MSC 115. In particular, the user equipment 101, when camped on the E-UTRAN, transmits a Location Update request to the MSC 115 via the UTRAN/GERAN. For example, the user equipment 101 may be aware of, and registered with, both the E-UTRAN 103 and the UTRAN/GERAN 105. As described below, the MSC 115 is operable to detect that this request is received from a user equipment 101 which is currently camped on the E-UTRAN 103. In response to this detection, the MSC 115 proceeds to notify the MME 113 of the user equipment 101 switching from the E-UTRAN 103 to the UTRAN/GERAN 105. In response to the notification, the MME 113 proceeds to perform the routing data and in particular the MME 113 proceeds to change the routing setup from being associated with the E-UTRAN 103 to being associated with the UTRAN/GERAN 105. For example, the MME 113 may change the routing information for incoming packet session requests from pointing to the MME 113 serving the E-UTRAN base station 109 to pointing to the SGSN 117 serving the UTRAN/GERAN base station 107.

The notification of the MME 113 from the MSC 115 is in the example provided via an intermediate SGSN 117. Specifically, the MSC 115 is arranged to generate a message indicating that a routing change should occur for the user equipment 101 and to send this to the SGSN 117, whose routing information is maintained by the MSC. In response, the SGSN 117 identifies the appropriate MME 113 and transmits a context request message to the MME 113. In response to receiving the context request message, the MME 113 proceeds to perform the routing data change.

Thus, the system of FIG. 1 may provide a simpler and more efficient circuit switched fallback technique. In particular, there is no requirement for setting up dummy packet sessions resulting in reduced complexity, resource and in particular call setup delay.

Figure 3:
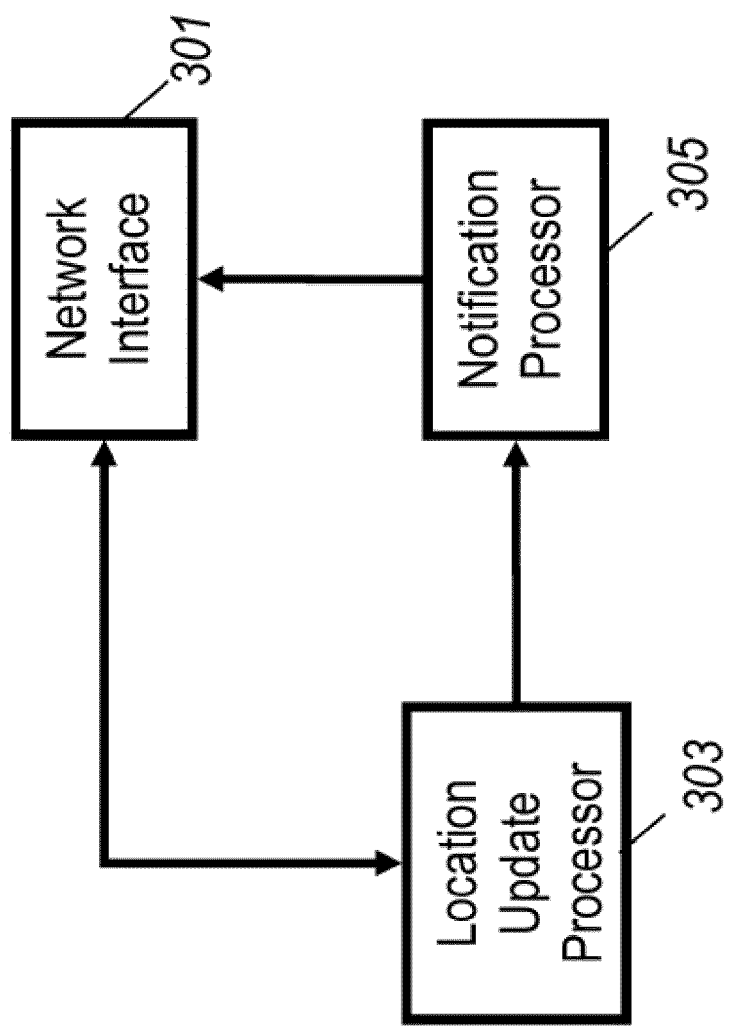
FIG. 3 illustrates an example of elements of a Mobile Switching Centre in accordance with some embodiments of the invention.
Figure 4:
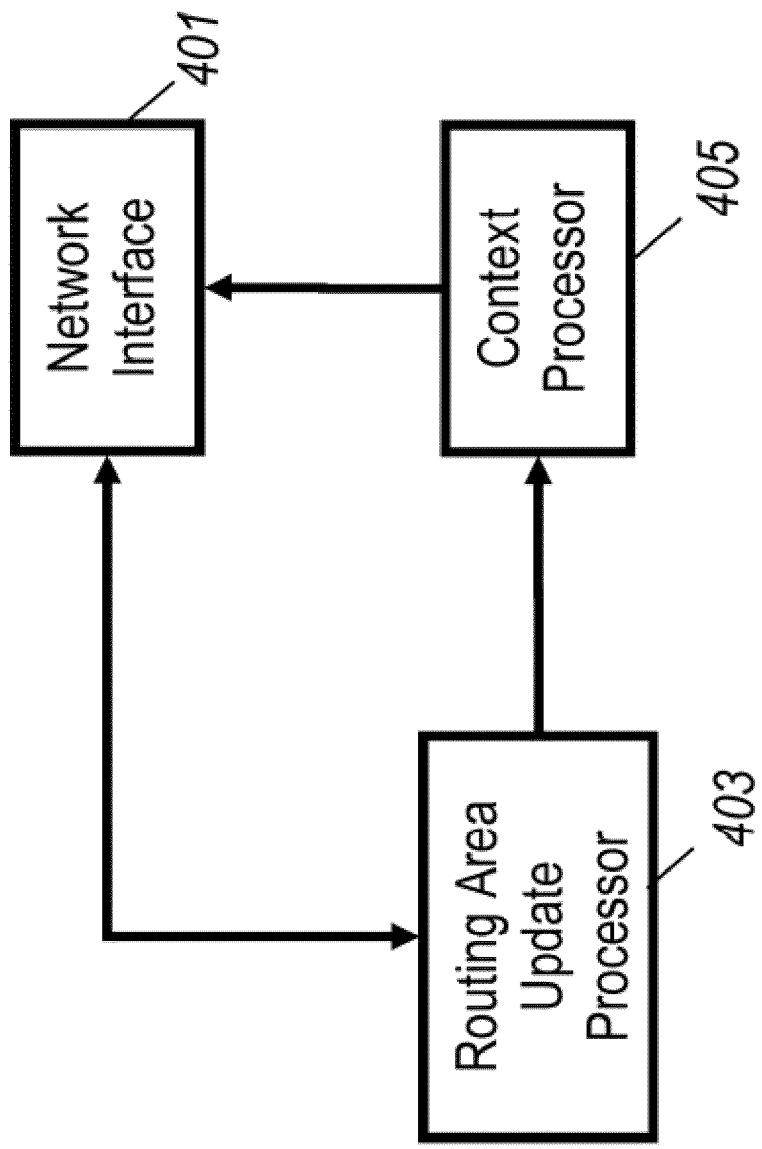
FIG. 4 illustrates an example of elements of a Serving GPRS Support Node in accordance with some embodiments of the invention.
Figure 5:
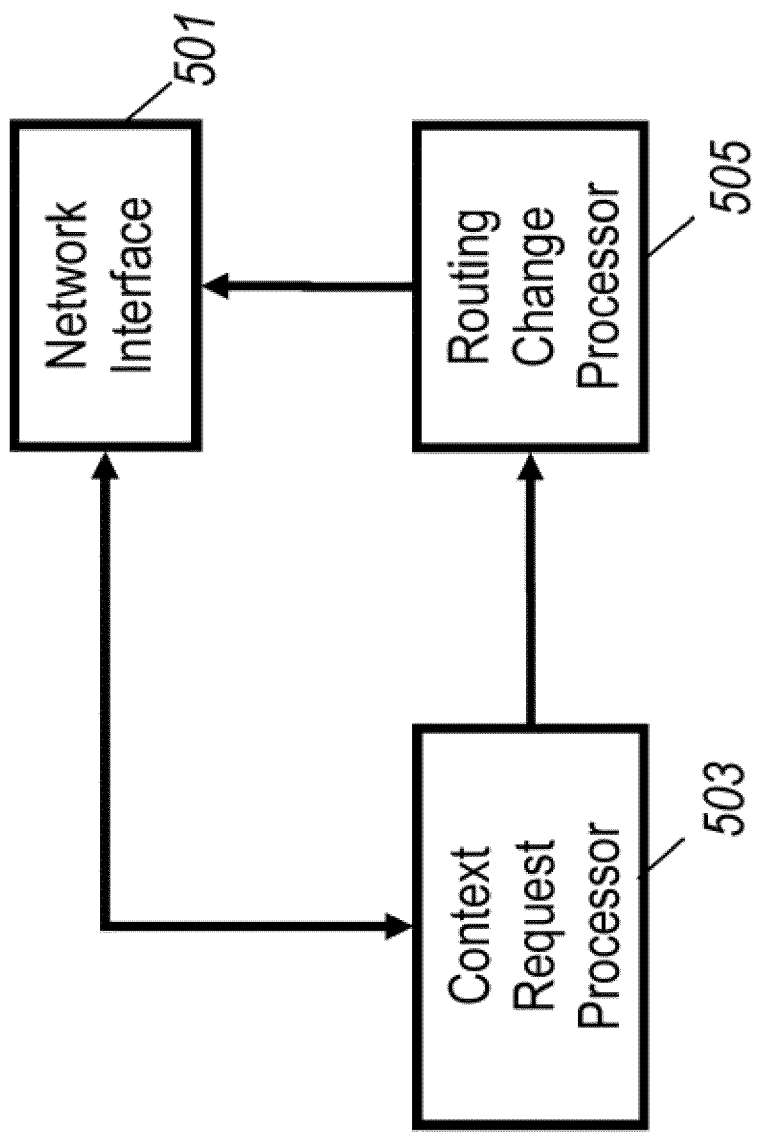
FIG. 5 illustrates an example of elements of a Mobility Management Entity in accordance with some embodiments of the invention.
Figure 6:
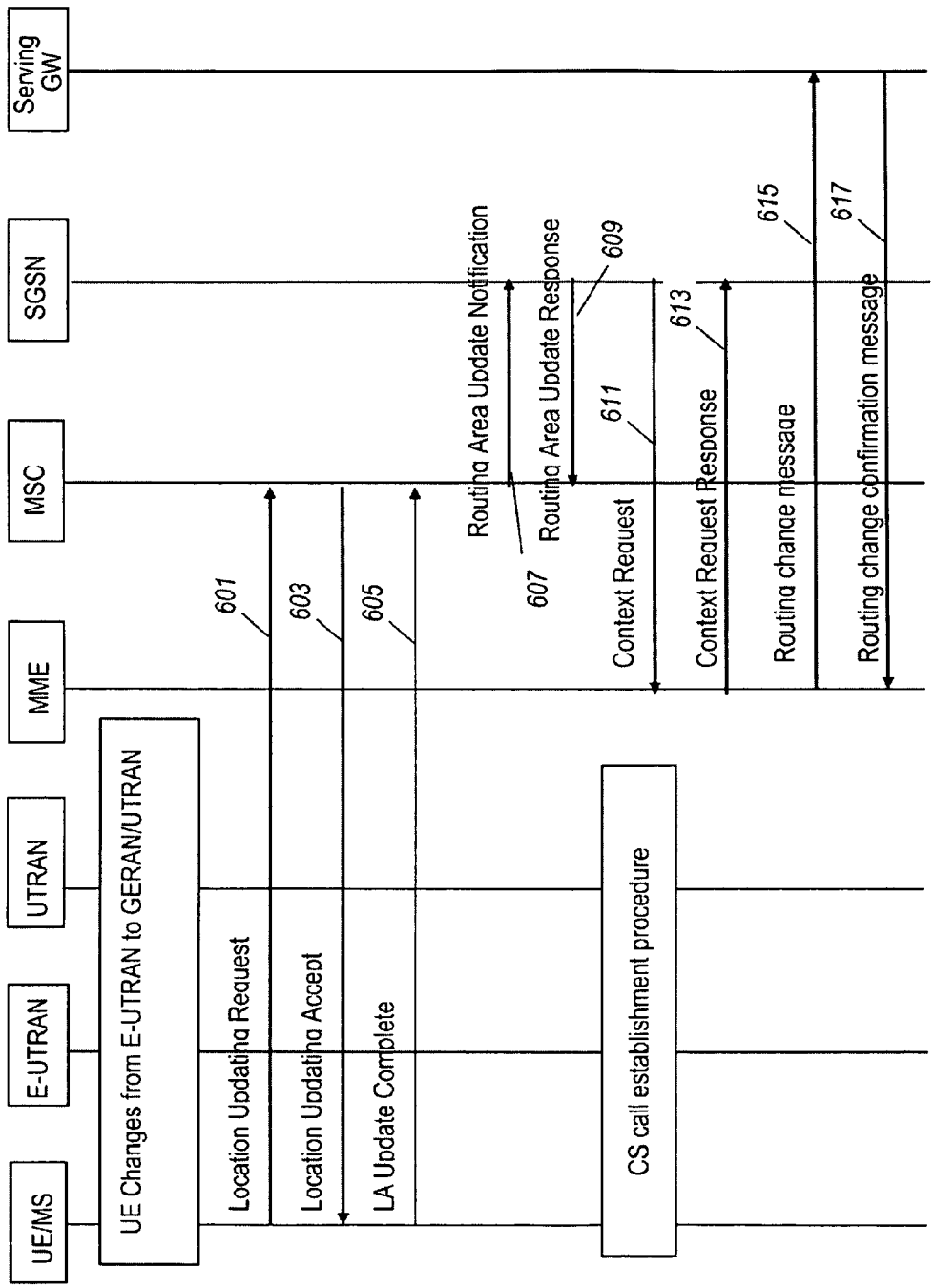
FIG. 6 illustrates an example of a signalling flow in accordance with some embodiments of the invention.

The operation of the system of FIG. 1 will in the following be described in more detail with reference to FIGS. 2-6. Specifically, FIG. 2 illustrates elements of the user equipment 101, FIG. 3 illustrates elements of the MSC 115, FIG. 4 illustrates elements of the SGSN, FIG. 5 illustrates elements of the MME 113 and FIG. 6 illustrates an exemplary signalling flowchart associated with the circuit switched fallback operation in accordance with some embodiments of the invention.

In the described example, the user equipment 101 is initially registered with both the E-UTRAN 103 and the UTRAN/GERAN 105 and is camped in idle mode on (only) the E-UTRAN 103. Furthermore, the user equipment 101 is within the coverage area of both the UTRAN/GERAN base station 107.

Figure 2:
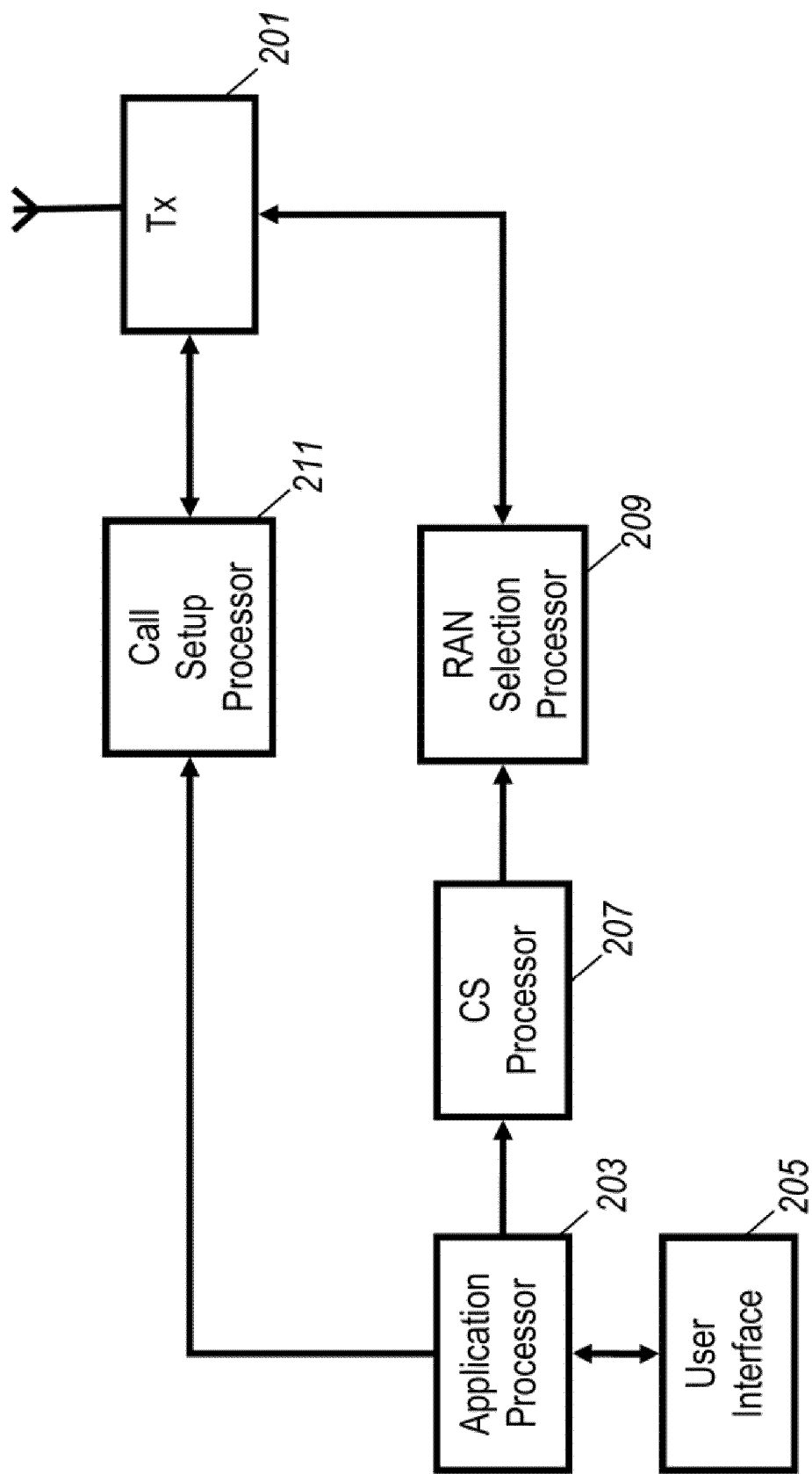
FIG. 2 illustrates an example of elements of a user equipment in accordance with some embodiments of the invention.

As illustrated in FIG. 2, the user equipment 101 comprises a transceiver 201 which is arranged to communicate over the air interface in accordance with the E-UTRAN and UTRAN/GERAN air interface standards. However, the transceiver 201 comprises only a single radio receiver and accordingly the user equipment 101 is in idle mode only monitoring signals from either the E-UTRAN 103 or the UTRAN/GERAN 105. In the initial scenario, the user equipment 101 is camped on the E-UTRAN 103 and monitors paging and control channels thereof while in idle mode. Thus, for an incoming call or packet data session to be initialised, the user equipment 101 must in this scenario be reached via the E-UTRAN base station 109.

The user equipment 101 furthermore comprises an application processor 203 which is operable to execute a number of different applications including communication applications. Specifically, the application processor 203 may be operable to execute, e.g., a voice call application, an Internet browsing application, a text message communication application, a location service application etc.

The application processor 203 is coupled to a user interface 205 which in the specific example comprises a display and a keyboard.

The application processor 203 is coupled to a CS (circuit switched) processor 207 which is operable to detect when a circuit switched application which is supported by a circuit switched communication service is initiated.

It will be appreciated that any suitable method of detecting that an application using a circuit switched service is initialised may be used. For example, a number of services may be predefined as being circuit switched services and whenever the application processor 203 starts a new application, it may inform the CS processor 207 thereof.

Accordingly, the CS processor 207 may determine if the application is a circuit switched service.

In some embodiments, the detection of the initialisation of a circuit switched application may be done in response to a detection of a user action or input.

For example, in some embodiments it may be detected that the user starts entering a telephone number either by directly starting to key in the digits or by accessing a phone book stored in the user equipment 101. Accordingly, this user action may be detected as initiating a voice call application which is based on a circuit switched service.

As another example, the user initiation of a text message may be detected for example by the user selecting a message application and starting to enter text.

As yet another example, the user selection of a location service application based on circuit switched communication may be detected.

Thus, in the specific examples, the detection of the initiation of the circuit switched application is achieved prior to the application actually initiating any communication request and specifically prior to the application initiating any circuit switched communication. However, it will be appreciated that in other embodiments, the detection that a circuit switched application is being or has been initiated may be performed at the time of the application initiating the communication service and/or requesting communication resource. Indeed, the detection of a circuit switched application being or having been initiated may be performed by detecting that the circuit switched communication is being setup.

The CS processor 207 is coupled to a RAN selection processor 209 which is coupled to the transceiver 201 and which is operable to perform access network reselection between the two radio access networks 103, 105. In particular, when the CS processor 207 detects that a circuit switched application is being (or has been) initiated, it forwards an indication to the RAN selection processor 209. In response, the RAN selection processor 209 determines if the user equipment 101 is currently camped on the E-UTRAN 103 and if so it initiates a radio access network reselection process from the E-UTRAN 103 to the UTRAN/GERAN 105.

In particular, the RAN selection processor 209 reconfigures the transceiver 201 to operate in accordance with the air interface standards of the UTRAN/GERAN 105 and specifically it controls the user equipment 101 to start monitoring the paging and control channels of the UTRAN/GERAN 105 rather than the E-UTRAN 103.

In some embodiments, the RAN selection processor 209 initially determines whether the user equipment 101 is within the coverage area of a cell of the UTRAN/GERAN 105 before initiating any radio access network reselection. In particular, the RAN selection processor 209 can reconfigure the transceiver 201 to make measurements of the pilot signals of the UTRAN/GERAN 105 (such as BCCH transmissions). If these measurements indicate that the user equipment 101 can indeed be served by a base station of the UTRAN/GERAN 105, the RAN selection processor 209 proceeds to initiate the radio access network reselection. Otherwise, no radio access network reselection is performed.

If no UTRAN/GERAN coverage is available, the user equipment 101 may in some embodiments proceed to terminate the application, e.g., by not allowing the voice call to be made. However, in other embodiments and/or scenarios, the user equipment 101 may be arranged to support the circuit switched application using packet switched communications of the E-UTRAN 103. For example, the user equipment 101 may be able to support the voice call through a packet switched voice service.

The radio access network reselection and reconfiguration of the user equipment 101 is performed without the user equipment 101 transmitting any notification thereof to the E-UTRAN 103 and without the user equipment 101 setting up any packet sessions with either the E-UTRAN 103 or the UTRAN/GERAN 105.

However, as illustrated in FIG. 6, the user equipment 101 transmits a location update message to the MSC 115. Thus, the circuit switched domain of the UTRAN/GERAN 105/core network 111 is informed of the radio access network reselection.

Specifically, and referring now to FIG. 6, the user equipment 101 can send a Location Updating Request message 601 to the MSC 115. The Location Updating Request 601 may for example be a Location Updating Request message in accordance with 3GPP standard TS 24.008 or a Routing Area Update Request message in accordance with 3GPP standard 24.008. Furthermore, the Location Updating Request message 601 can contain an identification of the cell/base station of the UTRAN/GERAN 105. For example, the Location Updating Request message can comprise a Location Area ID or the Location Updating Request may contain a 3G Routing area ID.

In addition the Location Updating Request 601 comprises a subscriber identity for the user equipment 101. In particular, the Location Updating Request 601 can contain a 3GPP Packet-Temporary Mobile Subscriber Identity (P-TMSI) in accordance with 3GPP standard 24.008. The P-TMSI is specifically the P-TMSI that is derived from the S-TMSI that is allocated to the user equipment 101 when camped on the E-UTRAN 103 and can allow the MSC 115 to identify that the Location Updating Request 601 is received from a user equipment 101 that was previously camped on the E-UTRAN 103, i.e., the MSC 115 can use the P-TMSI to detect that the message is received in response to a radio access network reselection from the E-UTRAN 103 to the UTRAN/GERAN 105 rather than just in response to a cell reselection within the UTRAN/GERAN 105.

An S-TMSI is a temporary identity which deviates from the P-TMSI in that the S-TMSI is used for paging packet users in the E-UTRAN, while the P-TMSI is used to page packet users in the UTRAN/GERAN. In the system, the P-TMSI may for example be used to determine the S-TMSI used for the user equipment 101 in the E-UTRAN 103.

In some embodiments, the Location Updating Request 601 may alternatively or additionally comprise a 3GPP S-Temporary Mobile Subscriber Identity, S-TMSI in accordance with 3GPP standard 23.401. Thus, if the user equipment 101 does not have a P-TMSI it may instead include the S-TMSI.

As illustrated in FIG. 3, the MSC 115 comprises a network interface 301 for communicating with other network elements of the core network 111 and the UTRAN/GERAN 105. The network interface 301 is coupled to a location update processor 303 which receives the Location Updating Request 601 from the user equipment 101.

When receiving the Location Updating Request 601, the location update processor 303 detects that the message comprises a subscriber identity of a user equipment 101 which is currently registered for the UTRAN/GERAN 105 but not currently camped on any cell thereof. Specifically, in response to the P-TMSI or S-TMSI, the MSC 115 identifies that the user equipment 101 is currently camped on the E-UTRAN 103 and thus that the Location Updating Request 601 is a request for a radio access network reselection from the E-UTRAN 103 to the UTRAN/GERAN 105.

The location update processor 303 may then proceed to validate the user equipment's 101 presence in the new cell (and location area). If due to roaming restrictions or access restrictions, the user equipment 101 is not allowed to be attached in the location area, or if subscription checking fails, the MSC 115 rejects the location area update with an appropriate cause sent in a (RAU) reject message to the user equipment 101.

If the validation is successful the MSC 115 responds to the user equipment 101 by sending a Location Area Update Accept message 603 to the user equipment 101. The Location Area Update Accept message 603 may specifically comprise a new TMSI and a new Location Area Identity (LAI) for the UTRAN/GERAN 105. If the Location Area Update Accept message 603 includes a TMSI, the user equipment 101 acknowledges the new TMSI by returning a TMSI Reallocation Complete message 605 to the MSC 115.

Following this interaction, the user equipment 101 is able to setup a circuit switched call to support the circuit switched application. Specifically, the user equipment 101 comprises a call setup processor 211 which is coupled to the application processor 203 and to the transceiver 201. The call setup processor 211 can thus initiate a circuit switched call setup after the access network reselection process.

In the specific example the initiation of a circuit switched application thus results in a radio access network reselection process being performed in anticipation of a circuit switched call being set up at a later stage. This may allow a faster call setup and may in particular allow that fast circuit switched call setup is achieved when the application requests the circuit switched call setup.

In the example, the routing information of the core network 111 and the E-UTRAN 103 is subsequently changed to reflect the switch of the user equipment 101 from the E-UTRAN 103 to the UTRAN/GERAN 105. However, this is achieved by operations of the network elements and does not involve the user equipment 101.

The circuit switched call setup of the user equipment 101 is furthermore independent of this rerouting and specifically the call setup may be initiated at any time after the initial radio access network reselection and may in particular be setup before, simultaneously with or after the rerouting operations of the network elements.

The MSC 115 comprises a notification processor 305 which is coupled to the location update processor 303 and the network interface 301. The notification processor 305 is able to initiate the network rerouting from the E-UTRAN 103 to the UTRAN/GERAN 105 in response to the MSC 115 having received the Location Updating Request 601.

Specifically, the notification processor 305 may be able to notify the MME 113 of the access network reselection from the E-UTRAN 103 to the UTRAN/GERAN 105.

Specifically, based on the P-TMSI or the S-TMSI, the MSC 115 may in some embodiments identify the MME 113 that supports the user equipment 101 and in response the MSC 115 may transmit a notification message directly to the MME 113. In response to receiving this notification message from the MSC 115, the MME 113 may proceed to initiate the change of a routing association from being with the E-UTRAN 103 to being with the UTRAN/GERAN 105.

However, in the system of FIG. 1 the notification provided to the MME is indirect and is specifically via an intervening SGSN. Specifically, in response to the MSC 115 having received the Location Updating Request message 601 (and following validation as previously described), the notification processor 305 proceeds to generate a routing area update notification message 607 which is transmitted to the SGSN 117.

The SGSN 117 may specifically be the SGSN 113 serving the UTRAN/GERAN base station 107 supporting the user equipment 101 following the radio access network reselection. The routing area update notification message 607 is an indication that the user equipment 101 has moved from the E-UTRAN 103 to the UTRAN/GERAN 105 and is thus generated and transmitted to an SGSN 117 when the MSC 115 has detected that the Location Updating Request is received from a user equipment 101 that was previously camped on the E-UTRAN 103.

The routing area update notification message 607 may comprise one or more identifications of the user equipment 101. Specifically, the routing area update notification message 607 may comprise the previous P-TMSI (and/or S-TMSI) as well as the new TMSI assigned to the user equipment 101.

As illustrated in FIG. 4, the SGSN 117 comprises a network interface 401 for communicating with other network elements. The network interface 401 is coupled to a routing area update processor 403 which receives the routing area update notification message 607. The routing area update processor 403 is furthermore coupled to a context processor 405 which is further coupled to the network interface 401.

When receiving the routing area update notification message 607, the routing area update processor 403 determines that the message is an indication that a radio access network reselection has been performed and that the E-UTRAN 103 must be notified thereof. Accordingly, it feeds the user equipment identification data to the context processor 405.

In response, the context processor 405 proceeds to generate a routing update message which is transmitted to the MME 113. In addition, it generates a Routing Area Update Response message 609 which is returned to the MSC 115 to confirm that the routing area update notification message 607 has been received.

In the specific example, the routing update message is a 3GPP Context Request message 611 in accordance with 3GPP standard TS 23.401. The context processor 405 can specifically identify the MME 113 previously supporting the user equipment 101 in response to the P-TMSI (or S-TMSI) comprised in the routing area update notification message 607.

Thus, the SGSN 117 may use a standardised Context Request message 611 to initiate the routing update associated with the radio access network reselection. However, the Context Request message 611 is not generated in response to a message received directly from the user equipment 101 or indeed in response to any packet switched domain signalling. Rather, the Context Request message 611 is generated in response to the routing area update notification message 607 received from the MSC 115. Thus, the rerouting in the packet domain is instigated in response to operations between the user equipment 101 and the MSC 115 in the circuit switched domain.

As illustrated in FIG. 5 the MME 113 comprises a network interface 501 which interfaces the MME to other network elements of the core network 111 and the E-UTRAN 103. The MME 113 further comprises a context request processor 503 which receives the Context Request message 611 from the SGSN 117.

In response to receiving the Context Request message 611 from the SGSN 117, the context request processor 503 generates and returns a Context Response message 613. The Context Response message 613 comprises context data in accordance with the 3GPP technical standard 23.401 including for example PDP Contexts, PDN GW addresses and Serving GW address.

The context request processor 503 is furthermore coupled to a routing change processor 505 which is further coupled to the network interface 501. When the Context Request message 611 is received from the SGSN 117, the context request processor 503 forwards the identification of the user equipment 101 comprised therein to the routing change processor 505. Specifically, the Context Request message 611 may comprise the P-TMSI for the user equipment 101 and this is fed to the routing change processor 505.

The routing change processor 505 is arranged to initiate a routing association change which changes the routing association for the user equipment 101 from being an association with the E-UTRAN 103 to being an association with the UTRAN/GERAN 105.

Specifically, the routing change processor 505 may initiate a routing association change which changes the routing information stored in the system for incoming packet session requests and paging requests from pointing to locations within or associated with the E-UTRAN 103 to pointing to locations within or associated with the UTRAN/GERAN 105. Thus, the routing association change may change a routing address currently pointing to an address within or associated with the E-UTRAN 103 to point to an address within or associated with the UTRAN/GERAN 105. Specifically, a stored routing address for the user equipment 101 may be changed from pointing to the MME 113 to point to the SGSN 117.

As a specific example, the E-UTRAN 103 and UTRAN/GERAN 105 may share a common gateway network element to which all incoming packet session setup requests and packet switched paging messages for the user equipment 101 is routed independently of which radio access network 103, 105 the user equipment 101 is currently camped.

In such systems the routing change processor 505 may proceed to generate a routing change message 615 which comprises the identification of the user equipment 101 as well as the routing address of the SGSN 117. The routing change message 615 is then transmitted to the gateway network element which in response proceeds to change the stored routing address for the user equipment 101 such that all future received incoming data packets and/or packet data session setup requests are routed to the SGSN 117 rather than to the MME 113. In addition, the gateway network element may proceed to return a routing change confirmation message 617 to the MME 113. The routing change message 615 may for example be a Create Bearer Request message in accordance with 3GPP standard 23.401.

Thus, the described system may allow a user equipment to use a circuit switched fallback process to support circuit switched communications. In particular, a user equipment camped on an E-UTRAN may use circuit switched fallback to obtain a circuit switched communication service via a UTRAN/GERAN. Furthermore, the circuit switched fallback process does not require any additional/dummy packet sessions to be setup but allows a direct access to circuit switched communication services of the UTRAN/GERAN. Thus, a significantly faster and more efficient circuit switched call setup can be achieved.

Furthermore, the system allows routing changes associated with the radio access network reselection to be initiated by the circuit switched domain and specifically by the MSC serving the user equipment. The described approach may furthermore allow this routing change to be achieved by predominantly using existing 3GPP messages and processes thereby reducing the modifications required to a deployed system. Thus, improved backwards compatibility can be achieved.

Figure 7:
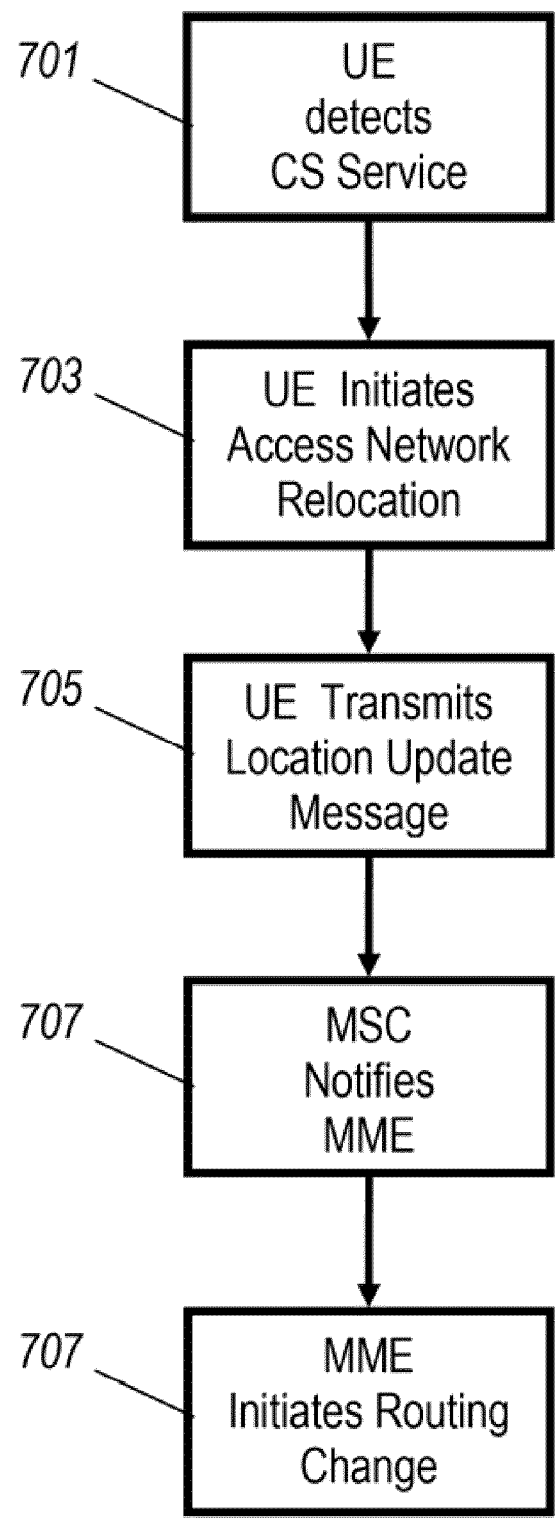
FIG. 7 illustrates an example of a flowchart of a method of operation for a cellular communication system in accordance with some embodiments of the invention.

FIG. 7 illustrates an example of a method of operation for a cellular communication system which includes a core network; a first radio access network coupled to the core network, the first radio access network being a packet switched network; and a second radio access network coupled to the core network, the second radio access network being a packet switched and circuit switched radio access network; a mobility management entity for managing user equipment mobility in the first radio access network; and a circuit switch mobile switching centre arranged to support circuit switched communications of the second radio access network.

The method initiates in step 701 wherein the user equipment detects an initiation of a circuit switched application supported by a circuit switched communication service.

Step 701 is followed by step 703 wherein the user equipment initiates an access network reselection process from the first radio access network to the second radio access network in response to the detection.

Step 703 is followed by step 705 wherein the user equipment transmits a location update message to the circuit switch mobile switching centre.

Step 705 is followed by step 707 wherein the circuit switch mobile switching centre notifies the mobility management entity of the initiation of the access network reselection process in response to receiving the location update message.

Step 707 is followed by step 709 wherein the mobility management entity initiates a routing association change for a routing association of the user equipment from an association with the first radio access network to an association with the second radio access network in response to the notification.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

For example, the described functionality, processors, means and/or units may as appropriate e.g. be implemented as executable routines implemented in a processing unit such as, e.g., a micro-controller, a digital signal processor and/or a central processing unit. Specifically, the functionality of different illustrated processors/means/units may as appropriate be implemented as one or more subroutines executed on the same processing unit.

The means, functionality, processors and/or units illustrated in the figures may thus as appropriate be implemented as different unique sets of programming instructions that are executed on one processor (or distributed over a plurality of processors), and/or can each be electronic circuitry such as a custom large scale integrated circuit state machine (or part of one). As another example, the means, functionality, processors and/or units may be implemented partly or fully as neural networks and/or fuzzy computing.

Also, the memory or data stores may be implemented as suitable memory elements, such as solid state memory (ROM, RAM, Flash memory etc), magneto and/or optical storage devices (hard disk, optical disc etc).

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, units, elements or method steps may be implemented by, e.g., a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system comprising:
a core network,
a first radio access network coupled to the core network, the first radio access network being a packet switched network;
a second radio access network coupled to the core network, the second radio access network being a packet switched and circuit switched radio access network;
a user equipment capable of supporting air interface communications of both the first radio access network and the second radio access network;
a mobility management entity for managing user equipment mobility in the first radio access network; and
a circuit switch mobile switching centre arranged to support circuit switched communications of the second radio access network; and wherein
the user equipment comprises:
a detecting unit for detecting an initiation of a circuit switched application supported by a circuit switched communication service, and
a reselection unit for initiating an access network reselection process from the first radio access network to the second radio access network in response to the detection, the reselection unit being arranged to transmit a location update message to the circuit switch mobile switching centre;
the circuit switch mobile switching centre comprises a notifying unit for notifying the mobility management entity of the initiation of the access network reselection process in response to receiving the location update message; and
the mobility management entity comprises a routing change unit for initiating a routing association change for a routing association of the user equipment from being an association with the first radio access network to being an association with the second radio access network in response to the notification.

2. The cellular communication system of claim 1 wherein the notifying unit is arranged to transmit a routing area update notification to a packet switched network element of the core network supporting the second radio access network; and the packet switched network element comprises a transmitter for transmitting a routing update message to the mobility management entity in response to receiving the routing area update notification.

3. The cellular communication system of claim 2 wherein the routing update message is a context request message.

4. The cellular communication system of claim 2 wherein the packet switched network element is a $3^{rd}$ Generation Partnership Project Serving General Packet Radio Service Support Node.

5. The cellular communication system of claim 2 wherein the routing change unit is arranged to change a routing address for the user equipment from a routing address of the mobility management entity to a routing address of the packet switched network element.

6. The cellular communication system of claim 2 wherein the routing area update notification comprises a subscriber identity for the user equipment and the packet switched network element is arranged to determine a routing identity for the mobility management entity in response to the subscriber identity.

7. The cellular communication system of claim 1 wherein the user equipment is further arranged to initiate a circuit switched call setup subsequent to the access network reselection process.

8. The cellular communication system of claim 7 wherein the user equipment is arranged to initiate the access network reselection process upon the detection of the initiating of the circuit switched application and prior to the initiation of the circuit switched call setup.

9. The cellular communication system of claim 1 wherein the location update message comprises a subscriber identity for the user equipment.

10. The cellular communication system of claim 9 wherein the subscriber identity is a $3^{rd}$ Generation Partnership Project Packet-Temporary Mobile Subscriber Identity.

11. The cellular communication system of claim 9 wherein the subscriber identity is a $3^{rd}$ Generation Partnership Project Packet S-Temporary Mobile Subscriber Identity.

12. The cellular communication system of claim 9 wherein the circuit switch mobile switching centre is arranged to determine an identity of the mobility management entity in response to the subscriber identity.

13. The cellular communication system of claim 1 wherein the routing association is a routing association for an incoming packet session setup request for the user equipment.

14. The cellular communication system of claim 1 wherein the mobility management entity is arranged to transmit a routing address change for the user equipment to a common packet switched gateway network element for the first radio access network and the second radio access network.

15. The cellular communication system of claim 1 wherein the detecting unit is arranged to detect the initiation of the circuit switched application in response to a detection of at least one of:
a user initiation of a text message;
an initiation of a telephone number entering; and
a user selection of a location service.

16. The cellular communication system of claim 1 wherein the user equipment further comprises a unit for determining if the user equipment is in the coverage area of a cell of the second radio access network, and wherein the user equipment is arranged to support the circuit switched application via the first radio access network if the user equipment is not in the coverage area of the cell.

17. The cellular communication system of claim 1 wherein the first radio access network is an Evolved-Universal Mobile Terrestrial System Terrestrial Radio Access Network.

18. The cellular communication system of claim 1 wherein the second radio access network is at least one of a $3^{rd}$ Generation Partnership Project (3GPP) third generation cellular radio access network and a 3GPP second generation radio access network.

19. A circuit switch mobile switching centre for a cellular communication system which includes a core network; a first radio access network coupled to the core network, the first radio access network being a packet switched network; a second radio access network coupled to the core network, the second radio access network being a packet switched and circuit switched radio access network; and a mobility management entity for managing user equipment mobility in the first radio access network; the circuit switch mobile switching centre comprising:
a unit for supporting circuit switched communications of the second radio access network; and
a notifying unit for notifying the mobility management entity of the initiation of an access network reselection process from the first radio access network to the second radio access network in response to receiving a location update message from the user equipment via the second access network.

20. A method of operation for a cellular communication system which includes a core network; a first radio access network coupled to the core network, the first radio access network being a packet switched network; and a second radio access network coupled to the core network, the second radio access network being a packet switched and circuit switched radio access network; a mobility management entity for managing user equipment mobility in the first radio access network; and a circuit switch mobile switching centre arranged to support circuit switched communications of the second radio access network; and
the method comprising:
the user equipment performing the steps of:
detecting an initiation of a circuit switched application supported by a circuit switched communication service, initiating an access network reselection process from the first radio access network to the second radio access network in response to the detection, and transmitting a location update message to the circuit switch mobile switching centre;

the circuit switch mobile switching centre performing the step of notifying the mobility management entity of the initiation of the access network reselection process in response to receiving the location update message; and the mobility management entity performing the step of initiating a routing association change for a routing association of the user equipment from being an association with the first radio access network to being an association with the second radio access network in response to the notification.

\* \* \* \* \*